United States Patent [19]

Yang

[11] Patent Number: 4,702,353

[45] Date of Patent: Oct. 27, 1987

[54] ACCELERATION LIMITER

[75] Inventor: Elmer C. Yang, Orange, Calif.

[73] Assignee: Pacific Scientific Company, Anaheim, Calif.

[21] Appl. No.: 774,287

[22] Filed: Sep. 10, 1985

[51] Int. Cl.$^4$ .............................................. F16F 9/00
[52] U.S. Cl. ............................ 188/135; 242/107.4 B; 297/216
[58] Field of Search .......... 188/134, 135, 136, 181 R, 188/374, 375; 242/107.3, 107.4 B, 107.4 R; 244/110 A, 122 R; 297/216

[56] References Cited

U.S. PATENT DOCUMENTS

3,089,564 5/1963 Smittle ................................ 188/375

Primary Examiner—Duane A. Reger
Attorney, Agent, or Firm—Knobbe, Martens, Olson & Bear

[57] ABSTRACT

Disclosed is a system for limiting the acceleration applied to a body which is to be protected from damage. In one arrangement, the limiting device is mounted on a helicopter seat which is vertically slidable so as to permit limited downward movement of the seat relative to its supporting structure in a crash situation. The limiting device having strap mounted on a reel is mounted to the seat, with one end of the strap being connected to a support. A capstan spring wound on the reel prevents rotation of the reel and unwinding of the strap until a predetermined acceleration is reached, as sensed by an inertia element within the reel. The sensor applies an unwinding force to the capstan spring sufficient to permit braked rotary movement of the reel. In this fashion, the acceleration applied to the seat occupant's body is limited to a safe level. In another situation, a capstan spring brake is employed to limit the acceleration applied to a load suspended by cables in a vehicle or other structure to prevent damage to the contents of the package. The example illustrated protects an electronic communication package in a vehicle to limit the affect of shock waves from nearby explosions.

25 Claims, 25 Drawing Figures

ACCELERATION LIMITER

FIELD OF THE INVENTION

This invention relates to systems for absorbing energy or shocks so as to protecting a body or mass from damage such as might occur in a helicopter crash or in an explosion shock wave.

BACKGROUND OF THE INVENTION

In many helicopter accidents, the structural integrity of the air frame is maintained, but the occupants involved often sustain spinal injuries. This is due to the fact that the human body has a relatively low tolerance to forces applied parallel to the spine. Currently, energy absorbing helicopter seat systems utilize load limiting mechanisms to reduce potentially injurious decelerations. Such systems allow limited movement of the seat while the energy is being absorbed. If such devices are designed with "fixed" energy absorber limit loads set only for an occupant of average weight, the system does not perform efficiently at the extremes of the occupant weight spectrum. For example, a heavy occupant may not be restricted sufficiently and may reach the limits of the seat movement, while a lighter occupant will not be able to take advantage of the available stroking distance and will be subjected to higher magnitudes of deceleration than desirable.

To overcme this problem, variable load energy absorbers have been developed wherein the apparatus may be adjusted to accommodate the weight of the occupant. However, such an arrangement has various drawbacks in that the occupant's weight including his suit and other gear with him must be known, in combination with the seat. Care must be taken to make sure that the proper adjustment is made, the accuracy of the apparatus is subject to many variables and the complexity of the system is also disadvantageous.

In one known system, a helicopter seat is slideably mounted to be moveable a short distance downwardly from its normal position in a crash situation. The lower portion of the helicopter shell may be specially constructed to accommodate the downward movement. When the deceleration forces of a crashing helicopter are felt, the chair will move downwardly relative to the air frame so that the occupant does not receive the same forces. Since only a limited space is available for such movement, it is necessary to absorb the energy of the movement. In its known system, energy is utilized to invert a thinwalled, metal tube. Also, rollers are employed to create drag against the exterior of the tube. Variability in the amount of energy absorbed is obtained by controlling the position of the roller relative to the tube. Because of the various shortcomings of such a system as mentioned above, a need exists for a system having improvements over such an arrangement.

In another energy-absorbing or motion-limiting situation, a need exists for a system to protect electronic packages from the shock of explosions in military warfare situations. For example, if a nuclear tactical weapon is detonated, shock waves can destroy unprotected communication systems throughout a very large area. However, by properly protecting such apparatus, very substantial shock waves can be tolerated. Electronic communication packages are often carried in special communication vehicles. Such vehicles are particularly susceptible to such shock waves because of being somewhat more moveable than fixed installations. The system employed to protect the package must, of course, be able to accommodate both the to and the fro movement which occurs with blasts of this nature.

Since the shock can be encountered from any direction, the protection system employed must be able to accommodate such multi-directional forces, which introduces a considerable complexity. It has been suggested that the package to be protected could be mounted or suspended by a group of springs, on all sides of a package. It has been determined, however, that the springs would have to be quite large to accommodate anticipated forces. For example, it has been determined that certain electronic packages can withstand 40 G-level forces. Springs capable of handling such forces would have to be quite large for a substantial package. Further, such system would still be load-sensitive such that the system would have to be specially designed for each package, or a satisfactory load adjusting system could be devised.

Accordingly, a need exists for better solutions to the energy-absorbing problems.

SUMMARY OF THE INVENTION

In accordance with the invention, there is provided a system that does not require adjusting for a particular load within practical strength limits of the apparatus involved. Instead of being load-sensitive, a system is employed that is responsive to acceleration. Parenthetically, it should be noted that, for purposes of this document, the term "acceleration" is intended to cover deceleration as well, in as much as the terms are the same except for the direction of change.

The apparatus of the invention includes a brake attached to the mass or body to be protected, and the brake is connected to a suitable support in a manner to permit limited movement of the mass relative to the support. The brake includes means responsive to acceleration for preventing movement of the mass relative to the support below a predetermined acceleration while permitting braked movement of the mass above such acceleration. In this manner, the mass is only subjected to acceleration that it can tolerate, and at that point, is allowed to move so that a damaging acceleration is hopefully not reached. The very significant advantage of such an arrangement is of course the fact that being acceleration responsive, the apparatus is independent of the load. Thus, special systems do not need to be designed for each load, or load-adjusting means need not be provided.

Corresponding to the apparatus, the method of limiting the acceleration applied to a mass comprises attaching brake means to the mass and connecting the brake means to a support in a manner to permit limited movement of the mass relative to the support. The brake means is utilized to prevent movement of the mass relative to the support. The acceleration applied to the mass is sensed, and the operation of the brake means is limited at a predetermined acceleration to permit braked movement of the mass relative to the support so as to prevent the mass from being subjected to acceleration levels above said predetermined acceleration.

As one example of the system, when used to accommodate the helicopter crash situation outlined above, a brake is applied to a helicopter seat which is slideably mounted for vertical movement in the air frame. The means for connecting the brake to a support affixed to the air frame is in one arrangement provided by an extendable strap which is wrapped around a cylindrical drum or reel forming a part of the brake. A capstan spring is provided having a plurality of coils that normally frictionally engage a cylindrical brake surface on the reel such that by restraining the capstan from rotation, the reel is prevented from rotating, which in turn prevents the strap from unwinding. The reel is thus normally held in this condition such that the seat is in effect rigidly supported in its normal operative position.

An inertia sensing element is moveably mounted adjacent the capstan spring in a manner such that the inertia of the sensor will cause it to move with respect to the reel and the capstan spring at a predetermined acceleration level. This movement is utilized to apply a force to the capstan spring that limits the engagement of the spring with respect to the brake surface so that the reel can rotate relative to the spring thus allowing the strap to unwind and the helicopter seat to move downwardly. This movement is still heavily braked by the spring, in that the seat can only move the limited distance allowed by the strap. It has been determined however that the brake can absorb significant energy such that the seat and its occupant can move sufficiently to avoid damaging acceleration in many survivable helicopter crash situations.

In a preferred form of the brake apparatus in the helicopter application, the acceleration sensor is in the form of an eccentrically mounted cylindrical mass adjacent the capstan spring, with the mass being spring-biased into a position wherein it does not affect the braking of the capstan spring. It is however mounted so that when a crash occurs, the sensor mass will at a predetermined acceleration level move against its biasing spring. This movement causes a force to be applied to the end of the capstan spring that starts to reduce the engagement force of the capstan spring with its braking surface so that rotation of the reel relative to the spring is permitted.

In the helicopter seat application of the invention, the movement that is being controlled is essentially in one direction. In other situations, it is desirable to protect a body from movement in two opposite directions, or in a number of equal and opposite directions. As mentioned above, there is a need to protect an electronic communication package from shock waves in any direction. In this form of the invention, a braking device is attached to each side of a body to be protected. Thus, for example, if the body or package is in the form of a cube, the braking device can be attached to each of the six sides of the cube. The braking devices includes a drum having several coils of a cable wound around its midsection with a central portion, being secured to the drum. The ends of the cable extend outwardly in opposite directions and are attached to supporting walls spaced from the package. The brake devices include a capstan spring positioned within the drum in frictional engagement with an interior cylindrical brake surface of the drum. An end of the spring is fixed with respect to mounting structure such that the drum can normally not rotate. Consequently, the package is in effect rigidly suspended by the cables.

However, the braking devices also include a pivotally mounted inertia mass or acceleration sensor positioned within the capstan spring with the pivotal axis of the sensor being oriented perpendicular to the cable portions extending between the brake and the supporting walls so that the inertia mass can move generally in the direction of the cable extending from that braking device. If the package is subjected to a shock wave resulting in significant acceleration forces on the package the inertia mass will lag and pivot and will cause a force to be applied to the end of the capstan spring in a direction that will limit the braking action of the spring so that the drum can rotate on the spring. The acceleration at which the sensor will operate to permit this movement is calibrated to limit the acceleration to a level that will not damage the package. The rotation of the drum and the resulting movement of the package unwinds cable from the drum in one direction while it winds cable from the opposite direction. Most shock waves have a corresponding reverse or reactive wave such that the package will want to move in the opposite direction. The acceleration sensor is mounted to move in either of these opposite directions so that a limited amount of braked movement is allowed in a back and forth direction for each of the brake devices. The use of a plurality devices on a single package can accommodate limited movement in any direction.

The braking devices also include a structure to provide self-centering of the package. That is, after a package has stopped moving as a result of a shock wave, it may or may not be located in its centered position. A means is provided whereby minor forces applied to the package caused by the travel of the truck in which it is mounted, will cause it to return automatically to its centered position.

DETAILED DESCRIPTION OF THE DISCLOSURE

Figure 1:
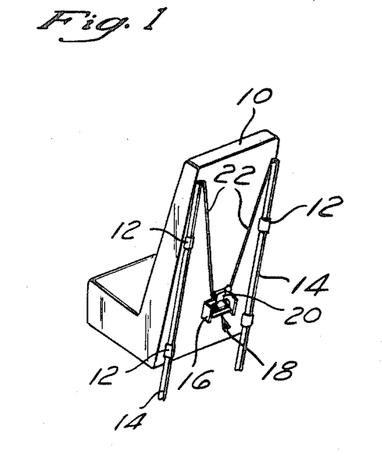
FIG. 1 is a perspective view of a helicopter seat mounted vertical movement and restrained by one form of the braking device of the invention.

Referring now to FIG. 1, there is schematically illustrated a helicopter seat 10 having four linear bushings 12 attached to the back of the seat, two on each side spaced vertically from each other. The slide bearings 12 are slideably mounted on two vertical supports 14 that are attached to the helicopter frame (not shown). These supports 14 may require other supporting structure, but for purpose of simplicity these components are not included.

Figure 2:
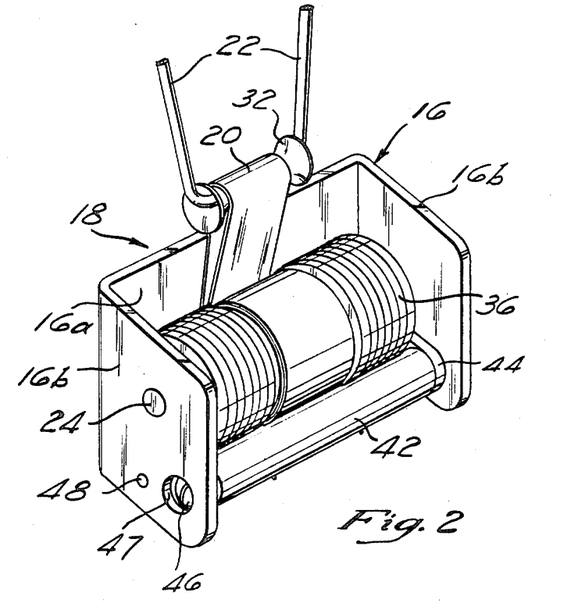
FIG. 2 is a perspective view of the braking device of FIG. 1.

Also attached to the back of the seat 10 is a brake device or assembly 18 having an extendible strap 20 (FIG. 2) that is connected to the lower end of a support cable 22, while the upper ends of the cable are attached to the upper ends of the supports 14 in suitable fashion. With this arrangement the strap 20 holds the seat in the position shown in that although the seat is mounted for slideable movement, the strap cannot be extended except in crash situations, as described below.

Referring to FIGS. 2-5, it may be seen that the brake assembly 18 includes a U-shaped bracket 16 having a back wall 16a and a pair of side walls 16b, with the back wall having suitable apertures formed therein for mounting the assembly to the helicopter seat 10. A reel mounting pin 24 extends between the bracket side walls 16b, with the ends of the pin being mounted in holes 26. A cylindrical tube 28 is concentrically positioned on the pin 26 and includes end plugs 30 which wedge into the tube ends and have central openings which receive the pin 24 and form bearings for the pin. Thus, the pin 24 in combination with the plugs 30 and the tube 28 form a reel or drum 31 on which the strap 20 is wound.

The strap is double layered so that it loops over a rotatable spool 32 on the lower end of the support cable 22. While the free ends of the strap 20 are anchored to the reel 31. The anchoring is by pins 34 which extend through the straps and through openings 35 in the reel tube 28 and through holes 25 in the mounting pin 24. This ensures that the components move as a single reel unit. The strap 20 is preferably made of strong, thin, flexible stainless steel so that it can withstand a substantial load and yet is compact. As can be seen, the strap is wound around only the mid-section of the reel tube 28.

Figures 3, 9:
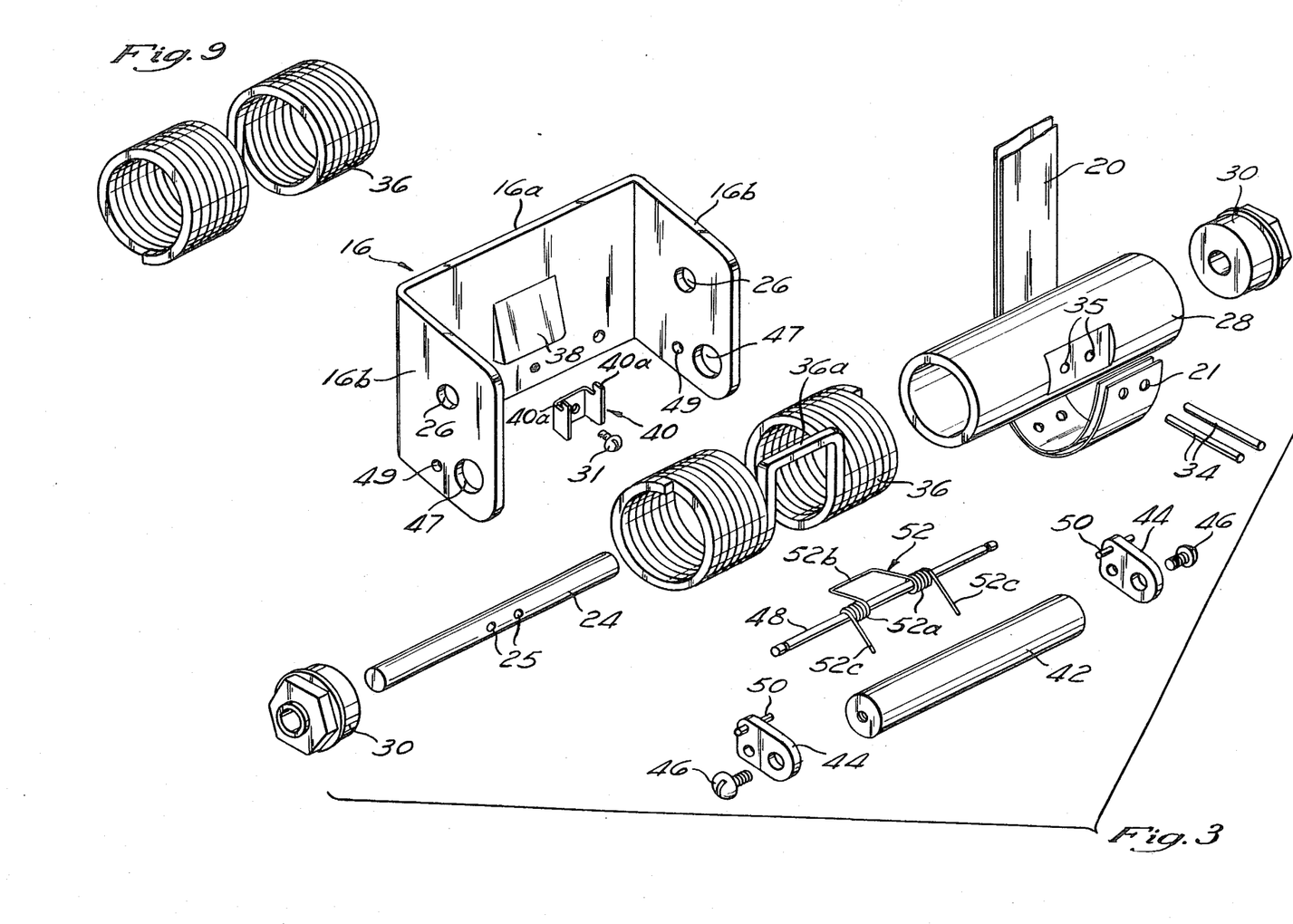
FIG. 3 is an exploded perspective view of the device of FIG. 2.
FIG. 9 is a perspective view of the capstan spring rotated 180° from that of FIG. 3.

Also positioned on the exterior of the reel tube 28 is a two-part capstan spring 36, having a plurality of coils surrounding the end sections of the reel tube 28 on either side of the strap 20, with the ends of the spring terminating adjacent the ends of the reel tube. The inner diameter of the coils in its free state as shown in FIG. 3 and in FIG. 9 is smaller than the outer diameter of the reel tube 28. Thus, to mount the spring on the tube, it is necessary to unwind the coils slightly, such that when the coils are released, they tightly grip the tube 28. The spring includes a straight connecting, anchor section 36a which spans the width of the strap 20. This anchor section 36a is clamped against the rear wall of the bracket 16 against a projecting portion 38 as may be seen in FIGS. 3 and 5. A retainer 40 held by a screw 31 threads into the back wall of the bracket 16 clamps the spring anchor section 36a against the projection 38. That spring section 36a is thus prevented from moving with respect to the bracket.

Extending generally parallel to the reel 31 is an acceleration sensor in the form of an inertia rod or mass 42, which is attached to a bracket 44 on each end of the rod by means of end screws 46. The bracket 44 in turn is mounted on a pivot pin 48 that extends generally parallel to the inertia rod 42, with the ends of the pivot rod being positioned in mating holes 47 in the bracket end walls. The mass 42 is thus eccentrically mounted with respect to the pivot 48. The end screws 46 are accessible through holes 47 in the bracket side walls 16b.

Also extending through each of the brackets 46 is a trigger pin 50 with the axially outer ends of the trigger pins being positioned adjacent the mounting bracket side walls 16b and the axially inner ends of the trigger pins extending adjacent the ends of the capstan spring 36.

Figures 4, 5:
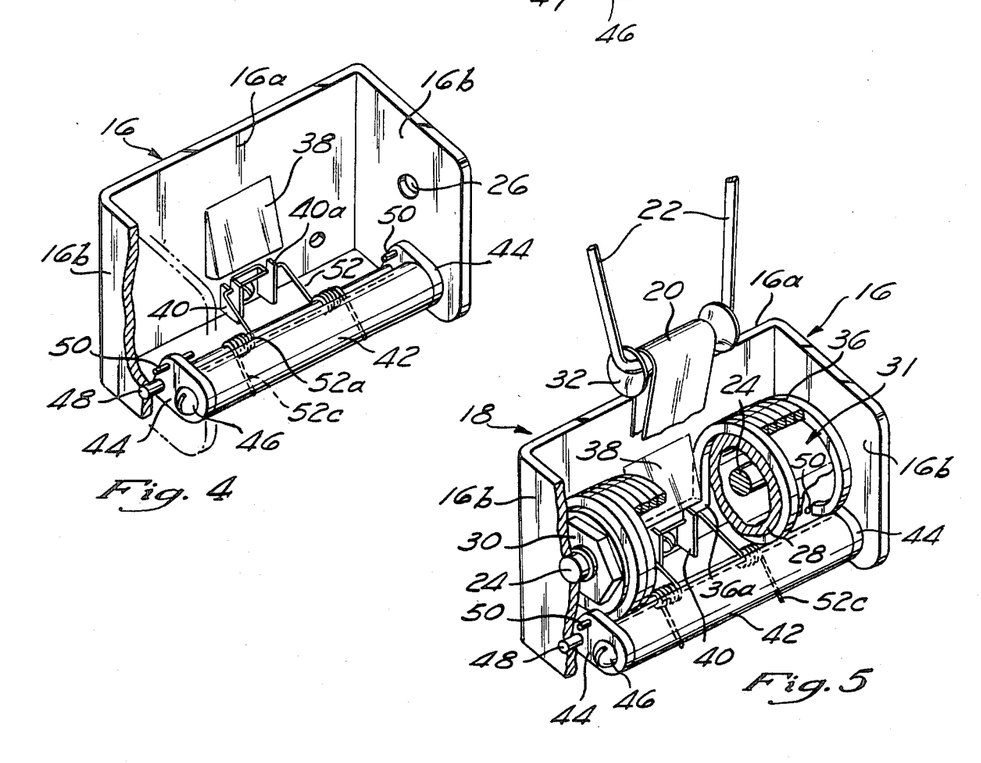
FIG. 4 is a perspective, partially cut-away view illustrating the bracket and acceleration sensing means of the device of FIG. 2.
FIG. 5 is a perspective, partially cut-away view similar to FIG. 4 but including portions of a capstan spring and its mounting reel.
Figure 6:
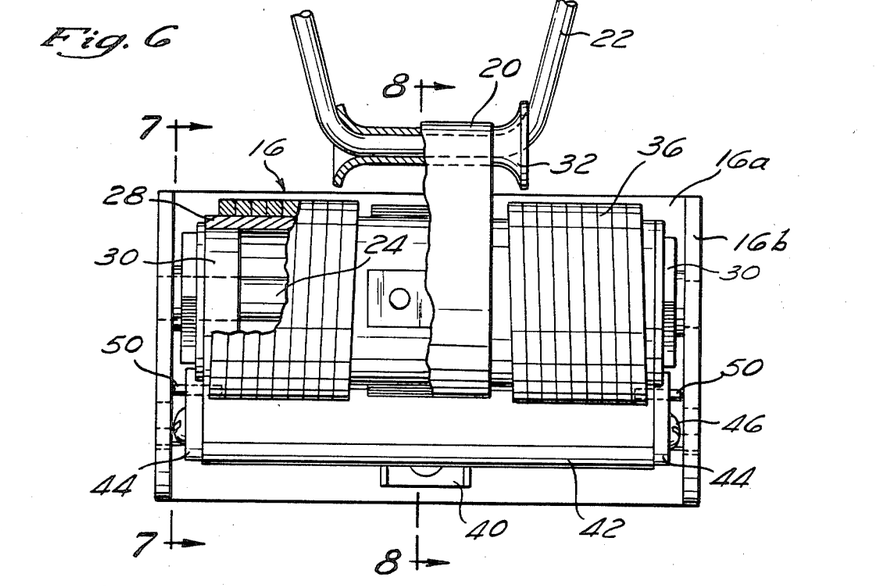
FIG. 6 is a front elevational view of the device of FIG. 2 partially cut away to illustrate the capstan spring and end plug construction.
Figure 7:
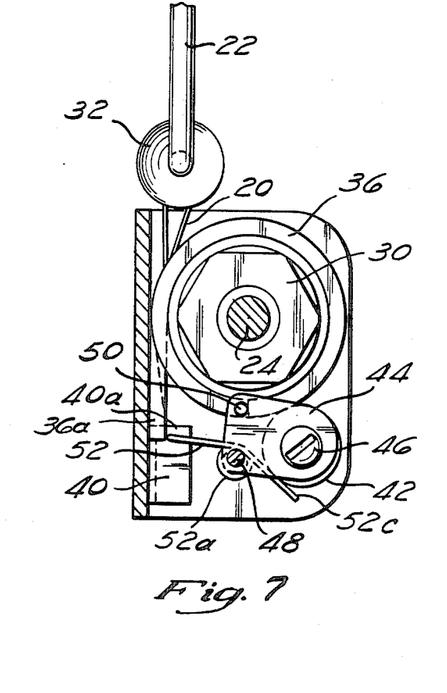
FIG. 7 is a cross-sectional view on lines 7—7 of FIG. 6.
Figure 8:
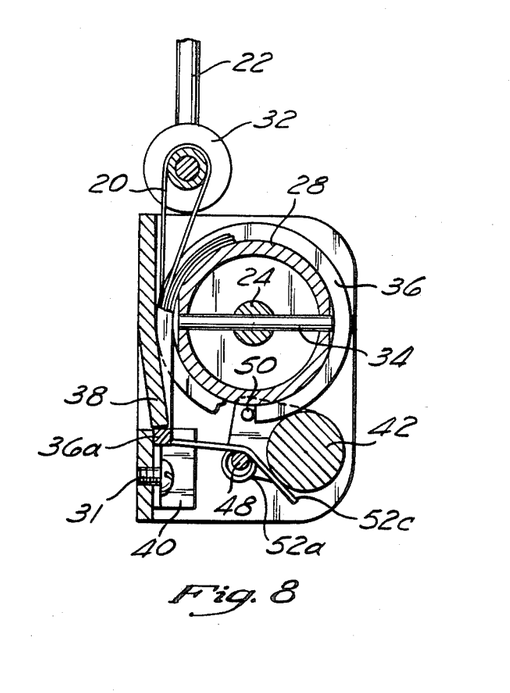
FIG. 8 is a cross-sectional view on lines 8—8 of FIG. 6.

An inertia rod biasing spring 52 is provided, having a plurality of coils loosely positioned on the pivot rod 48. The spring includes two coil sections 52a joined by a central anchor section 52b, which is anchored beneath two fingers 40a on the retainer 40, as best seen in FIG. 4. Since the retainer 40 is secured to the back wall of the bracket 16, the biasing spring is prevented from rotating around the pivot rod 48. The biasing spring 52 includes straight, finger-like end sections 52c which extend generally radially outwardly about 180° from the anchor section 52b and engage the exterior of the inertia rod 42. The biasing spring 52 is constructed such that the fingers 52c normally urge the inertia rod 42, together with its mounting brackets 46, into its upper or most counterclockwise position, as viewed in FIGS. 7 and 8.

Operation of the Embodiment of FIGS. 1-9

The extendable strap 20 of the brake assembly 18 is normally retracted as shown in the drawings, in that the strap is only intended to be extended during crash situations. The helicopter seat 10 is held in its uppermost position because the strap being anchored to the reel cannot readily be extended, and the reel being gripped by the anchored capstan spring cannot rotate. It should be noted that the weight of the seat applied to the strap produces a clockwise or winding force on the capstan spring, as viewed in FIG. 3 or 8, with the result that the weight merely causes the capstan spring to grip the reel tube more tightly.

If the helicopter should crash, the seat 10 as well as the supports 14 attached to the airframe of the vehicle abruptly starts to decelerate, quickly receiving high G forces. The inertia rod pivot 48 senses the same deceleration but since the pin is eccentrically mounted with respect to the pivot rod 48, the mass of the rod continues to move downwardly producing a pivoting clockwise movement as viewed in FIG. 7. This movement urges the trigger pin 50 in a clockwise, generally horizontal movement, urging the trigger pin against the end of the capstan spring, producing an unwinding force on the spring. The trigger pin on the opposite end of the reel is similarly producing an unwinding force on the opposite end of the spring, as viewed in FIG. 8. This unwinding force on the capstan spring, limits its gripping of the reel, with the result that at a predetermined acceleration the reel is allowed to rotate relative to the capstan spring. The capstan spring can of course not rotate, being anchored to the bracket. The strap 20 can then extend allowing the helicopter seat 10 and its occupant to slide downwardly on the supports 14. The capstan spring continues to grip the reel so that the downward movement of the seat and the extension of the strap is significantly braked. The seat can only move a limited amount in a typical helicopter airframe, but it does not need to travel very far in order to keep the G forces felt by the occupant to an acceptable level.

As indicated above, a very significant aspect of the invention is that the device is truly acceleration sensitive, which means that it will function essentially the same regardless of the weight of the occupant and the seat, and thus does not require adjustment for the weight of the occupant, and yet each occupant receives the same protection. Indeed, it is the inertia rod which is the acceleration sensor, and it functions essentially the same regardless of the weight of the occupant in the seat. In order to move, the inertia rod must overcome the urging of the bias spring 52. Thus the device is easily adjustable by changing the strength of the biasing spring or by changing the mass of the inertia rod. Using rods of differing materials is a convenient way to change acceleration without changing physical dimensions.

The brake assembly is not constructed to be automatically reusable, since it is anticipated that it will only be used during a crash situation. On the other hand, the inertia sensor automatically restores itself due to the existance of the bias spring 52. Further, the end plugs 30 are provided with the hex nut portions 30a that enable the reel to be manually rewound with a suitable wrench. This is convenient in test situations. Note that in rewinding, a bias is placed on the capstan spring that reduces its gripping force that facilitates rewinding.

Embodiment of FIGS. 10–25

Figure 10:
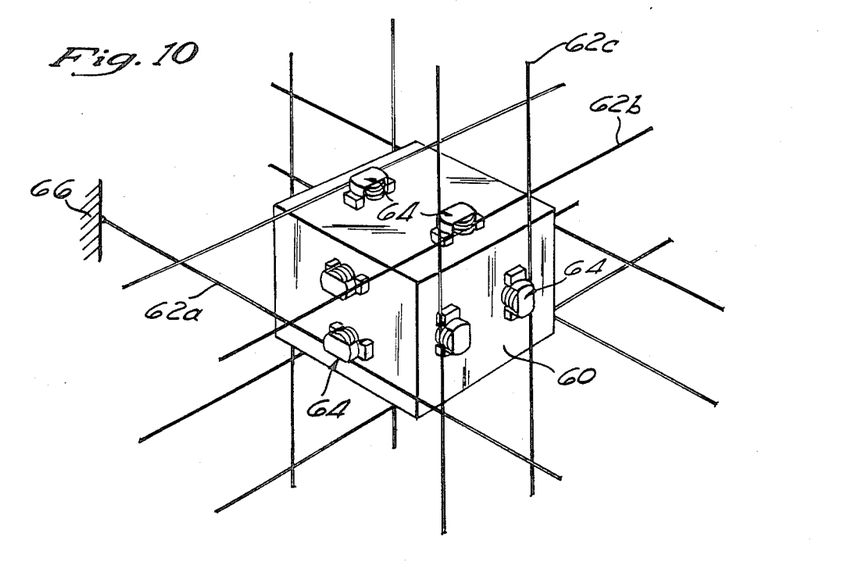
FIG. 10 is a schematic, perspective view of the second embodiment of the invention in use.

FIG. 10 illustrates a mass or body 60 which is to be protected from high acceleration forces. In accordance with the example mentioned above, the mass 60 is intended to represent a pakage of equipment, such as communication equipment carried in a vehicle storage area. In the event of an explosion, such as that caused by a small nuclear weapon, the objects very close to the explosion will of course be destroyed, but objects in a much larger area around the point of explosion may only be subjected to shock waves. A communications vehicle can withstand substantial shock wave forces, but more fragile equipment within the vehicle is more likely to be damaged, although such equipment can withstand considerable acceleration forces. In fact, it has been determined that such equipment can probably handle the forces incident to 40 G's.

In accordance with the invention, the mass 60 is supported by a plurality of cables 62 forming part of and extending from a plurality of brake assemblies 64 attached to the mass 60. More specifically, two brake assemblies are positioned on each of the six surfaces of the box-shaped mass 60 resulting in a total of twelve brake assemblies attached to the package. A cable 62 extends from each of the assemblies with the ends of each of the cables 62 being connected to supports 66, one of which is shown in FIG. 10. The supports represent the walls of the vehicle in which the package is transported including the top and bottom walls. The mass 60 could of course be supported in structure other than a vehicle.

As will be further discussed below, each of the brake assemblies 64 will not permit any movement of the mass 60 until it receives acceleration forces of a certain G level. Below that level, the mass 60 is essentially suspended in a fixed position.

Figure 11:
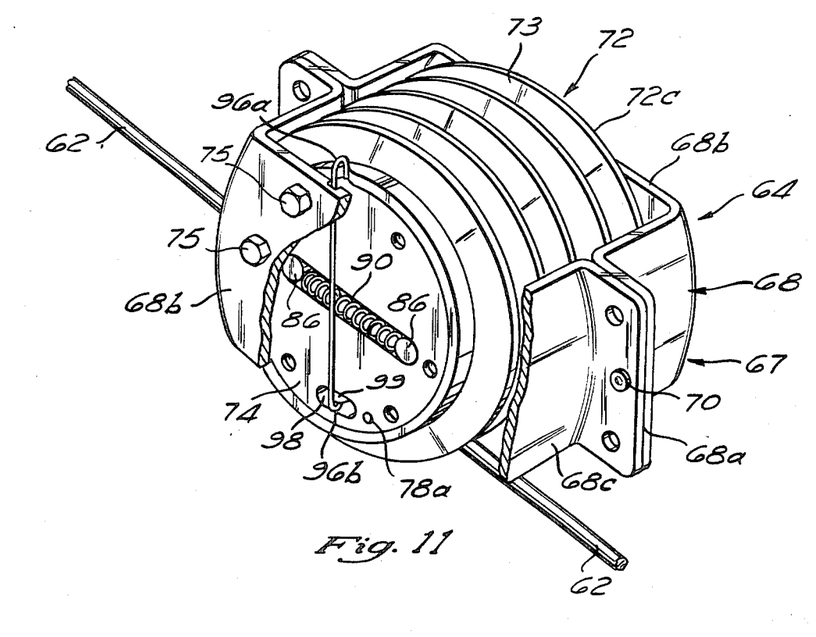
FIG. 11 is a perspective view of the braking device shown in FIG. 10 with a portion of the mounting structure cut away.
Figure 12:
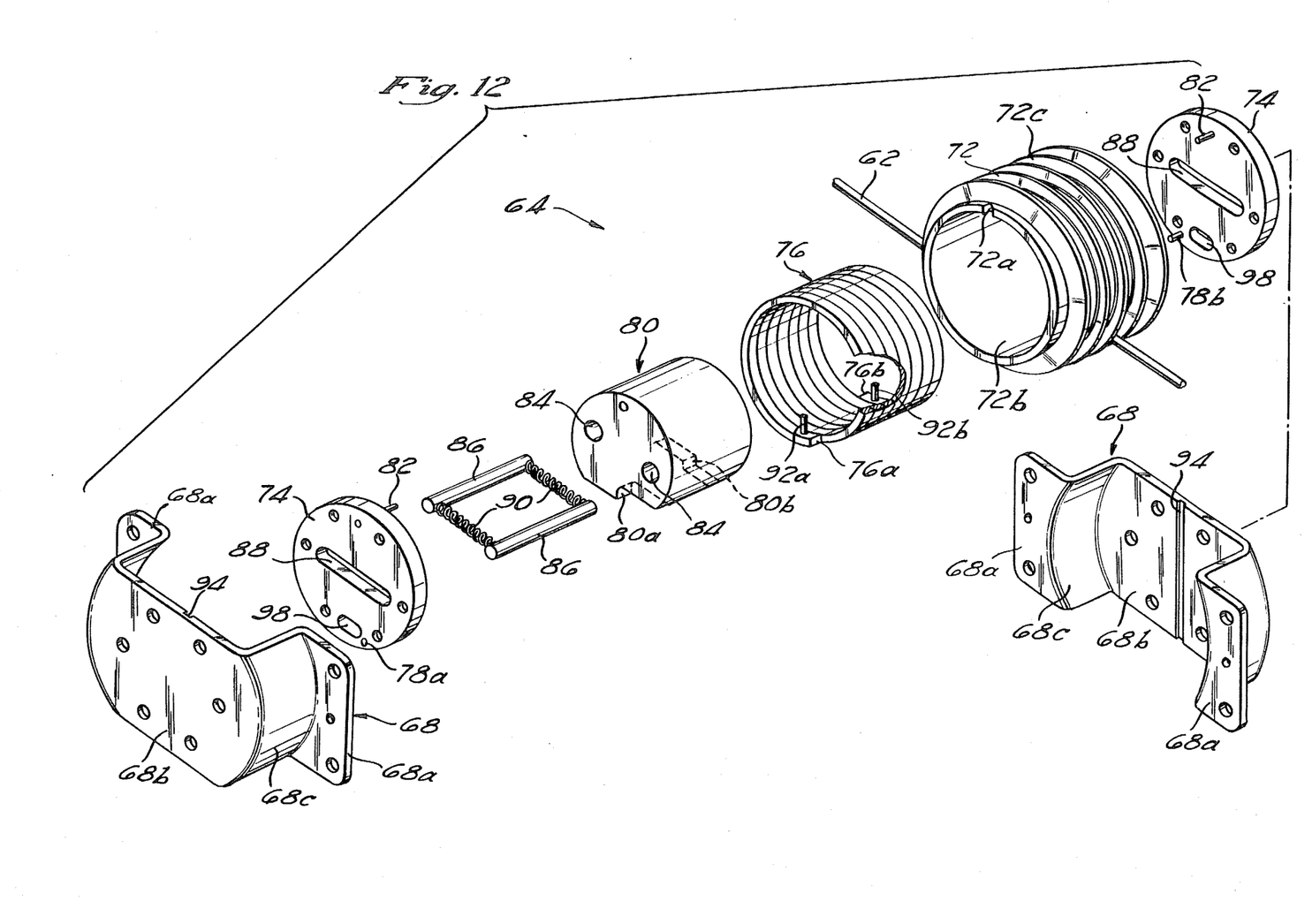
FIG. 12 is an exploded perspective view of the braking device of FIG. 11.
Figure 13:
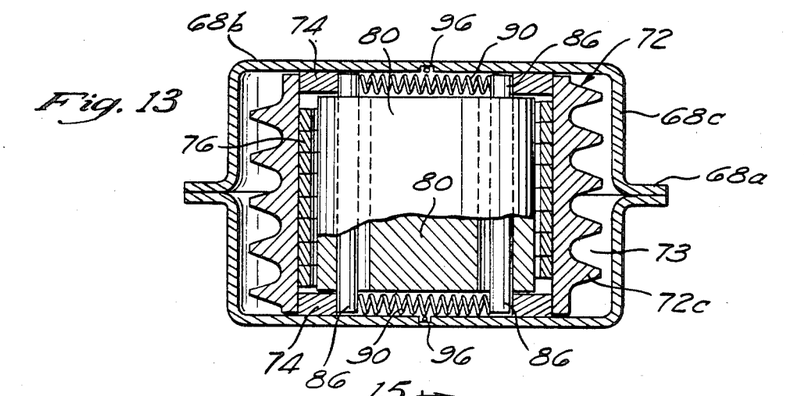
FIG. 13 is a horizontal cross-sectional view of the device of FIG. 11.

Referring to FIGS. 11 and 12, the brake assembly 64 includes an outer frame or housing 67 formed by a pair of brackets, each having a pair of diametrically opposed flanges 68a that extend radially outwardly and are positioned in face to face engagement with the flanges of the other bracket. A fastener 70 extends through the flanges on each side to hold the brackets together. Further, each of the flanges 68a are provided with mounting holes utilized for mounting the brake assemblies to the mass 60, through the use of suitable spacers and mounting bolts (not shown). Each of the brackets further includes an end wall 68b and a pair of diametrically opposed side walls 68c. The end and side walls define a cylindrical space or socket, with the segments of the socket not being included on the top and bottom portions, when viewed as in FIG. 11 and FIG. 12.

Within the space formed by the housing 67 there is positioned a cylindrical reel or drum 72, with the exterior of the drum having a spiral groove 73 formed by spiral rib 72c. A cable 62 is wound around the central section of the drum groove 73. The midpoint of the cable is anchored to the midpoint of the spiral groove 73 by means of a ball 71 fixed to the center of the cable and positioned in the center of the groove as well as in cut out portions in adjacent sections of the rib 72c forming the groove 73.

Positioned in each end of the drum 72 is a disk-shaped end plate or plug 74. The end plates 74 are fixed to the brackets forming the housing 68 by a plurality of bolts 75 extending through end plates and brackets. The drum can rotate relative to the end plates such that the periphery of the end plates in effect form bearings for the drum inner cylindrical surface 72b. Spaced axially inwardly from the disk-shaped end plates and also engaging the inner cylindrical surface 72b of the drum is a capstan spring 76 having a plurality of coils. One end 76a of the coil terminates adjacent one end plate 74 while the other end 76b terminates adjacent the other end plate. The outer diameter of the coils are larger in their unrestrained state than is the interior of the drums cylindrical surface 72b. Consequently, it is necessary to move the ends of the coil in a winding direction to reduce slightly the outer diameter of the coils. When the capstan spring is suitably positioned, and released, the coils will spring back and frictionally engage the surrounding drum surface. Thus in effect the capstan spring forms a brake element in combination with the drum cylindrical surface which forms a braking surface. This means that the capstan spring and the drum will rotate as a fixed unit unless one of the components is restrained and a force is provided that will ovecome the braking force. To this end, a stop in the form of a pin 74 is fixed to each of the end plates and extends inwardly to be in the path of the spring ends. That is, a stop pin 78a seen in FIG. 14 is in the path of and adjacent to the spring end 76a, and the stop pin 78b, shown in FIG. 12 cooperates with the other end 76b of the coil spring.

Positioned within the capstan spring is a generally cylindrical inertia mass 80 which is pivotally mounted on pivot pins 82 extending axially inwardly from end plates 74 into mating sockets in the upper portion of the inertia mass. The inertia mass is mounted for limited pivotal movement in either of two directions as illustrated by the arrow 83 in FIG. 14. The outer periphery of the inertia mass is spaced from the capstan spring to accommodate such limited movement.

To center the inertia mass or acceleration sensor 80 there are provided holes 84 in the inertia mass that extend generally parallel to the pivot pins 82. The holes 84 are spaced approximately 90° from the pivot pin 82 and are located near the outer periphery of the sensor 80, such that the holes 84 are generally diametrically spaced from each other. Within the holes 84, there are located a pair of positioning rods 86, with the ends of the rods extending into a diametrically extending groove 88 in each of the end plates 74. The diameter of the positioning rods 86 is somewhat smaller than that of the holes 84, as can be seen from FIG. 14. This enables the rods 86 to move to a limited extent towards and away from each other in the grooves 88. An elongated, restoring, coil spring 90 positioned in each of the grooves 88 extends between the rod ends and urges the rod ends into engagement with the ends of the groove 88.

Figure 14:
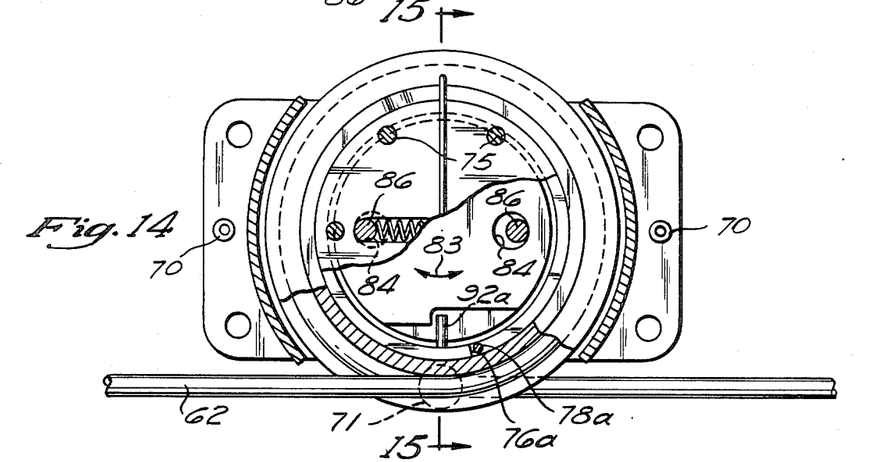
FIG. 14 is a front elevational view of the device of FIG. 13 with the housing in cross-section, and with a portion of the end plate cut away to show the inertia mass.

The lower portion of the inertia mass 80 is formed on one end of the mass with a cutout that creates a generally vertically extending shoulder 80a, as may be seen in FIGS. 12 and 14. The other end of the inertia mass 80 has a cutout extending in the other direction thus forming a shoulder 80b facing in the opposite direction from the shoulder 80a, as may be seen in FIG. 12. On each end of the capstan spring 76 there is provided a winding pin 92, extending generally radially inward, being attached to the spring a short distance from its end. As may be seen from FIG. 14, the upper end of the winding pin 92a is positioned close to the inertia mass shoulder 80a. The pin 92b on the opposite end of the spring is oriented to be close to the shoulder 80b on the opposite end of the inertia mass.

Operation of the Embodiment of FIGS. 10-15

In considering operation, assume that the electronics package 60 is centrally positioned and is initially not subject to any acceleration. In this condition, the inertia sensor 80 will be centrally positioned by its restoring springs 90 urging the positioning rods 86 outwardly to the position shown in FIG. 14, wherein the rods engage the radially outer surfaces of the oversized holes 84 in the acceleration sensor 80. If the vehicle carrying the package or mass 60 is subjected to a shock wave that produces a force on the cable 62, as viewed in FIG. 14, the inertia of the mass 60 together with the brake attached to it, will cause the mass 60 to attempt to remain stationary with the result that the portion of the cable extending to the left as viewed in FIG. 14 will attempt to unwind from the drum. This movement will produce a clockwise force on the drum. This force in turn is transmitted to the capstan spring within the drum by means of the interengaging braking surfaces. The end of the spring 76a as shown in FIG. 14 will be urged away from the stop pin 78a in the condition as shown in FIG. 14. However, the opposite end 76b of the capstan spring will engage the stop pin 78b to prevent the capstan spring and the drum from rotating. This force of the spring end against the stop 78b produces an unwinding action on the capstan spring which increases its braking force against the interior of the drum. Thus, the drum and the capstan spring together with the electronic pakage 60 and the cable 62 will move with the vehicle support wall 66.

However, the acceleration sensor 80, being pivotally mounted, will want to remain stationary due to its own inertia. With its mounting pin moving to the left as viewed in FIG. 14 the inertia mass in effect will pivot in a counterclockwise direction as viewed in FIG. 14, and eventually shoulder 80a of the sensor 80 will engage the spring windup pin 92a, if the acceleration force to which the package is subjected reaches a predetermined level. At that level, the inertia of the acceleration sensor 80 will produce sufficient force through its shoulder 80a to produce a force on the pin 92a urging the capstan spring coils to move in a windup direction. The sligt gap between the spring end 76a and the stop pin 74a permits some slight movement in the wind-up direction. This tends to decrease the outer diameter of the spring and thus decrease the braking effect, or prevent braking from further increasing. The result of this is that the drum can commence rotating with respect to the capstan spring. This rotational movement will continue to be heavily braked by the capstan spring, thus absorbing energy of the acceleration force applied to the package. Rotation of the drum in a clockwise direction allows the cable on the left side of the drum as viewed in FIG. 14 to be unwound from the drum while a corresponding amount of cable is wound onto the drum from the right end of the cable. The mass 60 can thus move to the right lagging the support movement and thus limiting acceleration applied to its mass.

With a shock wave from a large explosion, there is a corresponding reactive shock wave which will cause the vehicle and the electronic package to move in the opposite direction, which in turn will cause the acceleration sensor 80 to pivot in the opposite direction allowing the cable winding and unwinding to be reversed as well. This allows the mass 60 to lag to the left as viewed in FIG. 14. The operation of the spring ends and stops is also reversed, but the result is same, namely that braking action prevents rotation of the drum until the acceleration sensor 80 pivots to limit braking. This action can continue so long as the acceleration is sufficient to cause the drum to slip relative to the capstan spring. Thus, in this fashion the package is protected from G forces that exceed the predetermined level at which the drum can slip relative to the capstan spring. As one example, a particular package may be allowed to receive as much as 20 G's, and if that level is exceeded, the drum will move so as to keep the acceleration applied to the package from exceeding that level.

It should be understood that the electronic package does not have to move very far in order to maintain the acceleration on the package to an acceptable level. For example, in an arrangement being developed, the package can only move up to five inches in one direction, making a total of ten inches combined back and forth travel. Of course only a small portion of that travel may occur depending upon the forces applied. Relating the travel to the drum, the drum preferably does not rotate an entire revolution because of a self-centering feature discussed below.

It will be noted that if the force is applied in the direction of the cable 62a shown in FIG. 10, the cables 62a that extend perpendicular to the cable 62 will not have their acceleration sensors oriented to pivot in the same manner as the one in the braking assembly attached to the cable 62. The perpendicular cables 62a can however accommodate the limited travel of the package. This very limited stretching action on the perpendicular cables 62 can be accommodated by the cables themselves or the flexibility in the mounting walls.

Related to the foregoing, it should also be recognized that the shock wave forces may be applied from any direction such that with a force in an angled direction with respect to the faces of the package 60, all of the brake assemblies may accommodate small amounts of rotation of their drum relative to their capstan spring. A 45° shock wave from X and Y axes with 20 G's limitation on each axis will result in $\sqrt{2} \times 20 = 28.3$ G's. Further, a 45° shock wave from X, Y and Z axes with 20 G's limitation on each axis will result in $\sqrt{3} \times 20 = 34.6$ G's. This is still under 40 G's, which the equipment can handle.

Self Centering Feature of FIGS. 16–25

Although the mass 60 can move to and from the limited distances referred to above, it will stop when acceleration is below the predetermined level, which will likely be in a non-centered position with respect to the supports 66. Thus if the package 60 were later subjected to an additional shock wave, it might not be able to accommodate the movement if it has not been subsequently centered. As a further feature of the invention there is provided an automatic self-centering capability.

Figure 15:
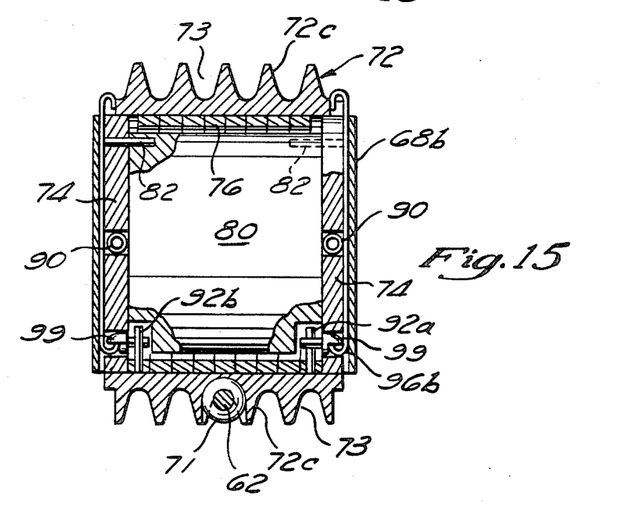
FIG. 15 is a vertical cross-sectional view along line 15—15 of FIG. 14.
Figure 16:
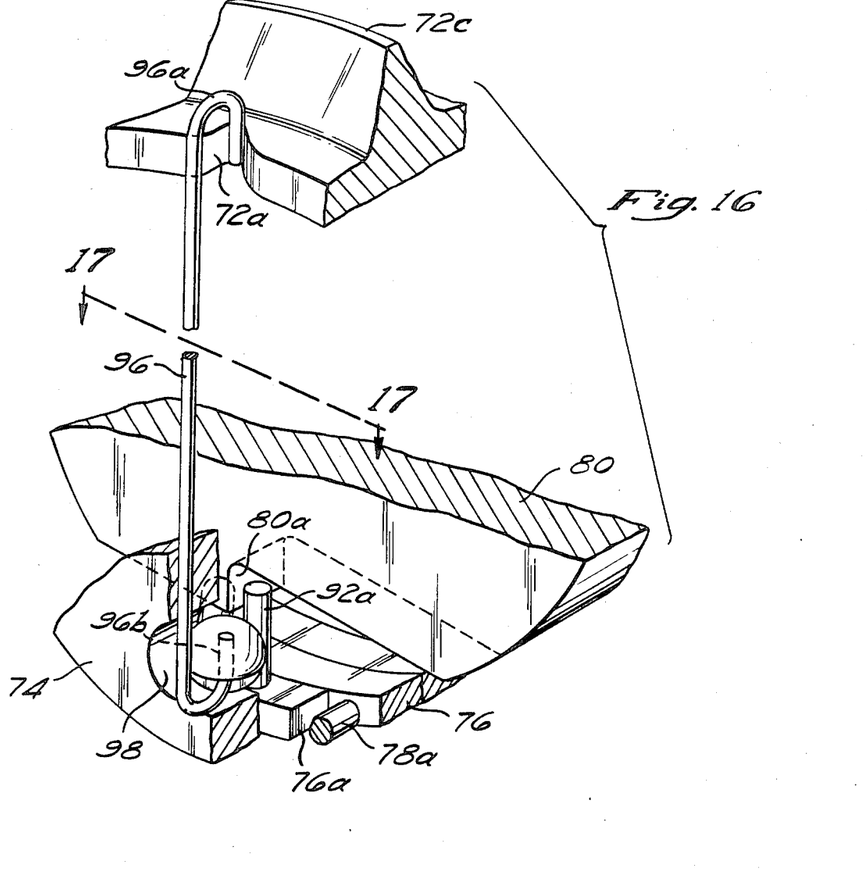
FIG. 16 is a perspective view of a portion of the braking device illustrating the relationship between the inertia mass, the end of the capstan spring and the self-centering structure in a centered position.
Figure 17:
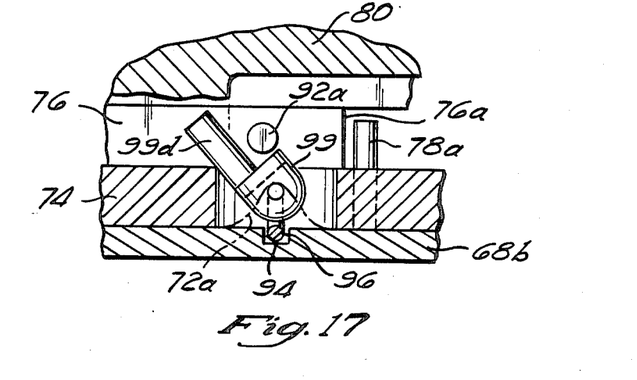
FIG. 17 is a cross-sectional view on lines 17—17 of FIG. 16.

Specifically, there is provided in the inner face of each of the fixed bracket end walls 68b a vertically extending groove 94, as seen in FIG. 12. Within this groove there is positioned a rod 96 which functions as a torsion rod or spring, shown in FIGS. 11, 14 and 15. The ends of the rods 96 are bent back on itself to form U-shaped positioning fingers 96a and 96b. The upper finger 96a located beyond the periphery of the end plate 74 normally extends axially inwardly towards the drum, to be positioned within a notch 72a formed in the tubular portion at each end of the drum. This condition is shown in FIGS. 15, 16 and 17.

The other end 96b of the rod 96 extends into a short slot 98 in the end plate 74 which extends generally parallel to the longer grooves 88, as may be seen in FIGS. 11 and 12. This slot 98 is located near the stop pin 78.

Figure 19:
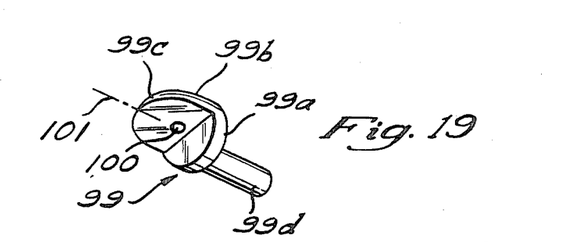
FIG. 19 is a bottom perspective view of the self-centering pawl of FIG. 18.
Figure 20:
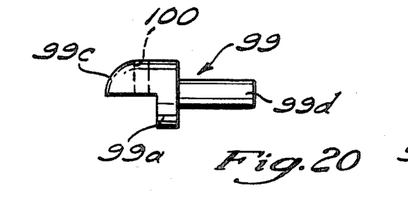
FIG. 20 is a side elevational view of the panel of FIG. 19.
Figure 21:
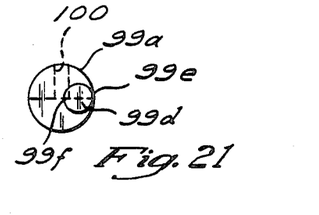
FIG. 21 is an end elevational view of the panel of FIG. 19.

Positioned in each of the slots 98 is a pawl 99 which is an irregularly shaped element that can be most easily visualized from FIGS. 19–21. The pawl 99 includes a central disk-shaped portion 99a which blends into a semi-cylindrically shaped portion 99b having a rounded nose 99c. Or stated differently, the left end of the pawl as viewed in FIGS. 19 and 20 may be thought of as initially having a cylindrical shape which is then rounded on its left end to give somewhat of a bullet shape, and then most of the lower nose portion of the bullet shape is cut away leaving the central disk-shaped portion 99a, a short cylindrical portion 99b and a rounded tip portion 99c.

A hole 100 is formed in the pawl cylindrical portion 99b, approximately midway between the tip of the portion 99c and the disk portion 99a. The hole 100 extends generally radially with respect to the axis 101 of the portions 99a and 99b.

The right end of the pawl as viewed in FIG. 20 includes a pin portion 99d which is slightly longer than the combination of the portions 99a, 99b, 99c. As may be seen from FIG. 21, the pin portion 99d has a diameter about equal to or slightly less the radius of the disk portion 99a. Also, it is eccentrically located with respect to the axis 101 such that the edge 99e of the pin portion 99d which is outermost from the axis 101 is aligned with the outer periphery of the side portion 99a, while the edge 99f is close to the axis 101.

Figure 18:
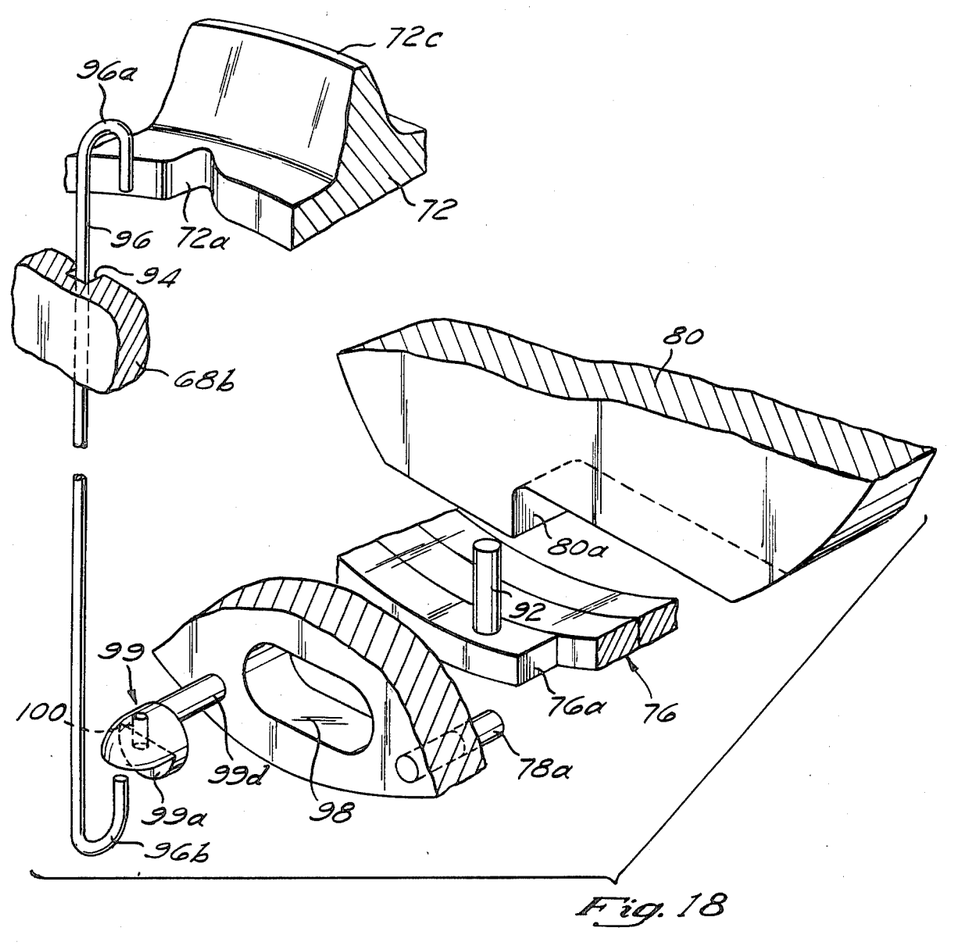
FIG. 18 is a view similar to FIG. 16 but showing the parts in exploded form.
Figures 22, 23, 24, 25:
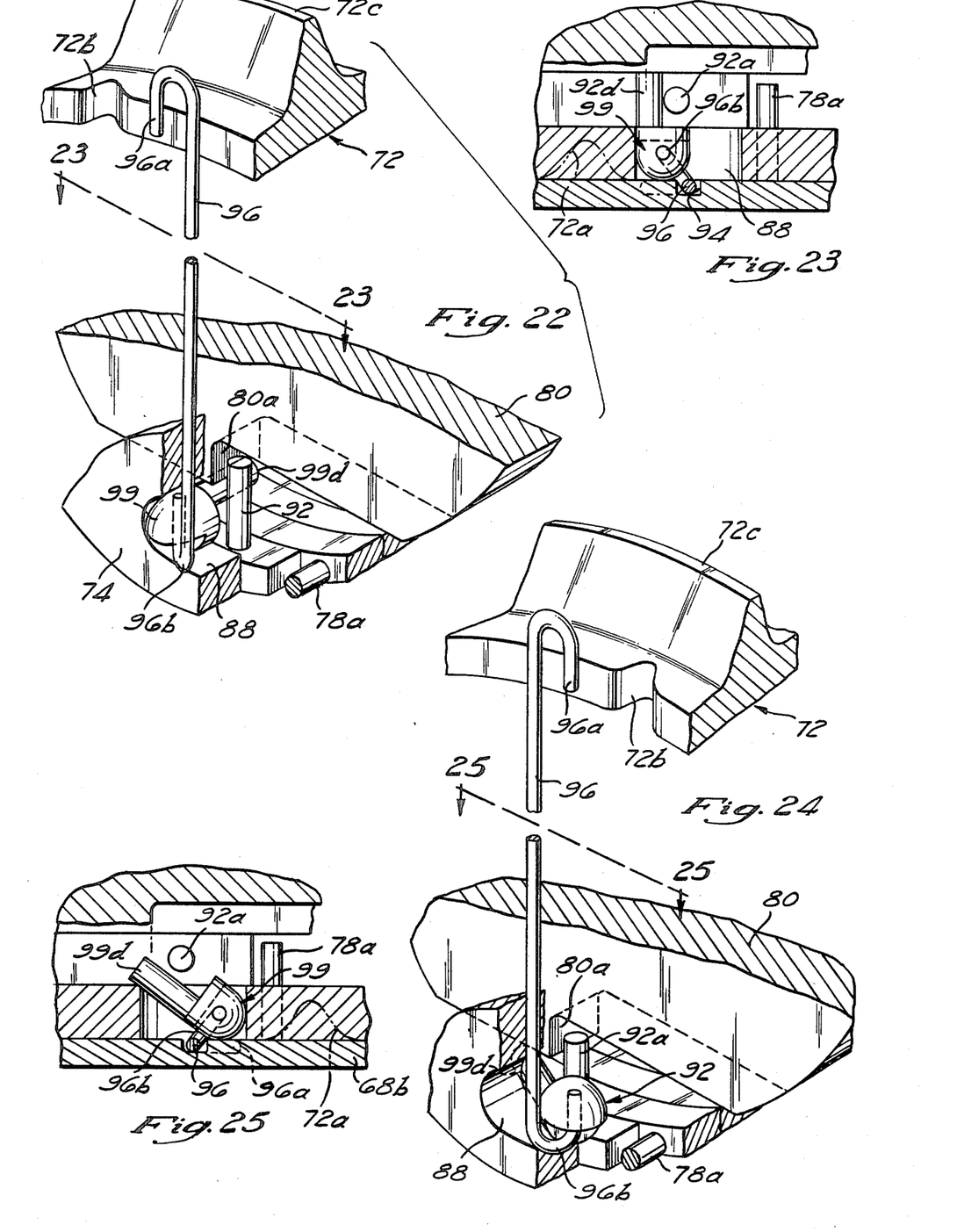
FIG. 22 is a perspective partially cut-away view of the structure shown in FIG. 16 with the drum having been rotated in one direction with respect to the center spring.
FIG. 23 is a cross-sectional view on line 23—23 of FIG. 22.
FIG. 24 is a perspective partially cut-away view of the structure of FIG. 16 with the drum rotated in the opposite direction to that shown in FIG. 22.
FIG. 25 is a cross-sectional view on line 25—25 of FIG. 24.

As may be seen from FIG. 18, the pawl is mounted on the lower end finger 96b of the rod 96. The flat surface of the semi-cylindrical portion 99b faces radially outwardly with respect to the axis of the drum 72. The pin portions 99a, 99b and 99c are basically positioned within the slot 98 as seen in FIG. 23 with the pin portion 99d extending axially inwardly adjacent to but perpendicular to the wind up pin 92 at the end of the capstan spring. Note that with the pawl 99 oriented as shown in FIG. 23 the face of the disk portion 99a adjacent the pin portion 99d is approximately flush with the axially inner face of the end plate 74.

It may also be noted from FIG. 16 that the vertical or radial position of the rod 96 is determined by the slot 98 in that the lower finger 96b is confined within the slot. Further, the slot is radially located so that the pin portion 99d of the pawl 99 is located radially inwardly but adjacent to the nearest coil of the capstan spring.

Operation of Self-Centering Mechanism

As indicated above, when the package or mass 60 is centrally positioned by its cable 62 and its brake assemblies 64, the centering rod 96 is oriented with its finger 96a extending into the notch 72a in the edge of the drum. This condition is shown in FIG. 11, 15, 16, and 17. The notch 72a is shown in phantom lines in FIG. 17 in that it is actually located above the components shown in solid lines in FIG. 17. Note also from FIGS. 16 and 17 that the pin portion 99d of the pawl 99 extends at an angle into the area adjacent the capstan spring to cooperate with the first capstan spring coil. The pin portion 99d extends between the gap or space formed by the edge of the slot 98 and the wind-up pin 92. The pawl is free to pivot about the rod finger 96b in this limited space. If forces are applied to the cable urging the drum to rotate, the brake will function in the manner described above to prevent rotation. The pawl 99 does not interfere with this normal operation.

If the brake is subjected to an acceleration sufficient to allow the drum to rotate with respect to the capstan spring the upper finger 96a of the positioning rod is pushed out of its notch 72b as shown in FIGS. 22–24. That is, the rod end 96a is turned 90° by the notch 72a in the direction of the drum movement to be out of the path of the drum movement. FIGS. 22 and 23 show the drum having moved in a counterclockwise direction away from the notch finger 96a, while FIG. 24 and 25 show drum movement in the opposite direction. The pin pawl end 96b has also rotated about the pin axis; however, the pawl portions 99a and 99b engage the end of the groove 98 so that the pin pawl end 96b can only rotate about 45° around the axis of the rod 96. The result of this is that the rod end 96a is twisted with respect to the end 96b and in that condition is under torsional stress so that the notch end 96a of the rod is urged to snap back into the notch 72b whenever the notch moves into the centered position in alignment with the finger 96a.

When the vehicle containing the electronic package 60 is moving, the package will attempt to move due to the normal jiggling of the vehicle as it moves along a typical roadway. This jiggling movement applied to the cable attempts to rotate the drum relative to the capstan spring. If this jiggling force attempts to move the drum in the direction such that the notch 72a is moved further away from the notch finger 96a the capstan spring prevents such movement in its usual fashion since the acceleration is far below the predetermined level at which movement is permitted. Such attempted movement would be in the counterclockwise direction of the drum as viewed in FIGS. 22 and 23. This causes the capstan spring end 76a to engage the stop pin 78a. This tends to increase the braking force preventing further movement of the drum notch away from the centering finger 96a.

However, jiggling movement on the cable that urges the drum to move in the clockwise direction as viewed in FIG. 22 attempts to move the capstan spring in the clockwise direction, but the spring windup pin 92 cannot move in that direction in that it engages pin portion 99d of the pawl 99. This produces a slight windup force on the capstan spring that permits a jiggling movement of the drum in the clockwise direction to move its notch 72a back towards the notch finger 96a. With sufficient jiggling action, the centered postition will once more be reached, at which point the centering rod notch finger 96a will snap into the notch due to the torsional spring action. Once centered, the pawl 99 returns to the condition of FIG. 17 so that the pawl does not function to provide any movement due to the jiggling motion so that the drum will remain centered until such time it is subjected to sufficient acceleration to overcome the braking action, in the manner described above. It should be noted that the centering pawl 99 does not interfere with the normal function of the acceleration limiting means. That is, the shoulders 80a and 80b on the inertia mass 80 are located radially inwardly from the end portion 99d of the pawl. Thus, the shoulder of the inertia member 80 is free to engage the radially inner end of the windup pin 92 as may be seen in FIG. 22.

When the drum has moved clockwise away from the centering rod 96 as shown in FIGS. 24 and 25, the stop 78b prevents further clockwise movement in the usual manner as described above under the operation of the embodiment of FIGS. 10-15. That is the pawl 99 in FIGS. 24 and 25 does not affect such action. That is, the notch finger 96a on the rod has been rotated 90° so it is engaging the edge of the drum, out of alignment with the notch 72a, while the pawl 99 on the rod end 96b prevents rotation beyond the 45° orientation illustrated in FIG. 25. With the pawl oriented in this position, it does not affect normal braking in the clockwise direction. Further, it does not function to return the drum to its centered position. However, the centering rod on the other end of the drum is at that time positioned in a manner comparable to that in FIG. 22, such that the centering rod on that side permits the desired jiggling action in the direction to permit the drum to move in the centered direction. Similarly, when the rod 96 shown in FIG. 22 was functioning as described, the rod on the other end of the drum was oriented comparable to that illustrated in FIG. 24. In other words, the centering rod on one end provides the centering action with the drum rotated in one direction and the centering rod on the other end provides the centering action when the drum has rotated in the opposite direction.

I claim:

1. Apparatus for limiting the acceleration applied to a body comprising:

brake means to be connected to said body; and means for connecting the brake means to a support in a manner to permit limited movement of the body relative to the support;

said brake means including means for sensing the acceleration of said body and means responsive to said acceleration sensing means for preventing movement of the body relative to said support below a predetermined acceleration, while permitting braked movement of the body relative to said support at said predetermined acceleration.

2. The apparatus of claim 1 wherein said brake means includes a rotatably mounted member and said connecting means includes a flexible, extendable element which is windable on said member with one end of the element being connected to said support to said support.

3. The apparatus of claim 2 wherein said member has a cylindrical brake surface, and said brake means further includes a capstan spring having a plurality of coils frictionally engaging said brake surface to prevent rotation of said member relative to the brake surface, and means for restraining rotation of said spring, and thereby preventing rotation of said member, and thus preventing movement of said body relative to said support.

4. Apparatus for limiting the acceleration applied to a body comprising:

brake means to be connected to said body; and means for connecting the brake means to a support in a manner to permit limited movement of body relative to the support;

said brake means including means responsive to acceleration for preventing movement of the body relative to said support below a predetermined acceleration, while permitting braked movement of the body relative to said support at said predetermined acceleration;

said brake means further includes a rotatably mounted member and said connecting means includes a flexible, extendable element which is windable on said member with one end of the element being connected to said support;

said member has a cylindrical brake surface, and said brake means further includes a capstan spring having a plurality of coils frictionally engaging said brake surface to prevent rotation of said member relative to the brake surface, and means for restricting rotation of said spring, thereby preventing rotation of said spring and said member, and thus preventing movement of said body relative to said support;

said brake means further includes an acceleration sensor movably mounted in a manner such that the inertia of the sensor causes the sensor to move relative to said spring; and means for transmitting movement of said sensor to apply a force on said spring to limit the braking force of the spring against the brake surface and thereby permit said braked movement between said spring and said member at said predetermined acceleration.

5. The apparatus of claim 4 wherein said brake means further includes a restoring spring urging said sensor into a position where it does not apply a force on said capstan spring.

6. The apparatus of claim 4 wherein said sensor is pivotally mounted in a manner such that movement of said sensor at said predetermined acceleration will cause the sensor to pivot and provide an actuating force to limit the braking action and thereby the force applied to said mass.

7. The apparatus of claim 1 wherein said body is a helicopter seat and an occupant, and wherein the seat is slidably mounted on a support for vertical movement, said brake means includes means for attachment to said seat, and said connecting means is extendable to allow movement between the brake means and said seat support.

8. Apparatus for limiting the acceleration applied to a body comprising:
brake means to be connected to said body; and
means for connecting the brake means to a support in a manner to permit limited movement of the body relative to the support;
said brake means including means responsive to acceleration for preventing movement of the body relative to said support below a predetermined acceleration, while permitting braked movement of the body relative to said support at said predetermined acceleration;
said body is a helicopter seat and an occupant, and the seat is slideably mounted on a support for vertical movement said brake means includes means for attachment to said seat, and said connecting means is extendable to allow movement between the brake means and said seat support;
said brake means includes a bracket for mounting on said seat and a reel rotatably mounted on said bracket, and said connecting means includes a flexible, extendable element wound on said reel, said brake means further includes a cylindrical brake surface on said reel, a capstan spring having a plurality of coils frictionally engaging said brake surface to prevent rotation of said reel relative to the brake surface, means on said bracket for restraining rotation of said spring and thereby prevent rotation of said reel which prevents unwinding of said element and movement of said seat relative to said support, said element being mounted in a manner such that increasing the force on the element increases the engaging force of said capstan spring against said brake surface.

9. The apparatus of claim 8 wherein said means responsive to acceleration includes an inertia responsive mechanism which applies a force to said capstan spring at said predetermined acceleration to limit the braking action by said capstan spring so as to permit braked movement of the seat relative to said support at said acceleration and thus limit the acceleration felt by said occupant to said predetermined acceleration.

10. Apparatus for limiting the acceleration applied to a body comprising:
brake means to be connected to said body; and
means for connecting the brake means to a support in a manner to permit limited movement of the body relative to the support;
said brake means including means responsive to acceleration for preventing movement of the body relative to said support below a predetermined acceleration, while permitting braked movement of the body relative to said support at said predetermined acceleration;
said body comprises a package to be suspended within a structure in a manner to be protected from shock waves, such as caused by an explosion, said brake means includes a housing, a drum rotatably mounted on said housing, said drum having an interior cylindrical braking surface, a capstan spring having a plurality of coils frictionally engaging said surface, said connecting means comprises an element having its mid-section wound on said drum with the element ends secured to one or more of said supports, an inertia sensor positioned within said capstan spring and pivotally mounted on said housing on an axis generally perpendicular to the portions of said connecting element extending between the drum and the supports, and means interconnecting said sensor and said capstan spring in a manner such that the sensor will apply a winding force to said capstan spring at said predetermined acceleration and thereby limit the braking action and permit limited rotation of said drum allowing said package to move towards one of said supports while the connecting element portion connected to one of said supports is being wound on said drum and the cable portion connected to the other of said supports is being unwound from said drum.

11. Apparatus for limiting the acceleration of a body comprising:
a bracket to be mounted on said body;
a member rotatably mounted on said bracket, said member having a brake surface;
an extendable element connected to said member for connection to a support in a manner to be extendable upon rotation of said member;
a spring having a plurality of coils frictionally engaging said brake surface to prevent rotation of said member relative to said brake surface, means for restraining rotation of said spring and thereby prevent rotation of said member and prevent extending of said element and movement of said body relative to said support, said spring being mounted in a manner such that increasing the forces to produce extension of said element increases the engaging force of said spring against said member;
an inertia sensor moveably mounted on said support in a manner such that the inertia of the sensor causes the sensor to move relative to said body; and
trigger means responsive to movement of said inertia sensor for applying a force on said capstan spring to limit the braking force of said spring against said member so as to permit movement between said spring and said member at a predetermined acceleration to limit the acceleration forces applied to said body.

12. Apparatus for controlling the forces applied to an occupant of a seat in a helicopter in a crash situation wherein the seat is mounted to be vertically movable in the helicopter relative to a support in the helicopter, said apparatus comprising:
a member rotatably mounted on said seat, said member having a cylindrical brake surface;
a flexible, extendable element wound on said member having one end anchored to said member and its other end adapted to be connected to said support so as to transmit the weight of said seat to said support;

a capstan spring fixed with respect to said seat and having a plurality of coils frictionally engaging said brake surface to prevent rotation of said member and thereby preventing unwinding of said element and preventing movement of said seat relative to said support;

a sensor moveably mounted with respect to said seat in a manner such that deceleration of the seat such as in a crash causes the sensor to move with respect to said seat; and trigger means responsive to such sensor movement for applying a force to limit the braking force of said spring against the brake surface so that the capstan spring will permit braked movement between said spring and said member at a predetermined acceleration to thereby allow the seat to move relative to said support and thus limit the forces applied to the seat and the occupant to a safe level.

13. Apparatus for preventing movement of a body below a predetermined acceleration and for permitting braked movement of the body at said acceleration, said apparatus comprising:

a bracket to be fixed with respect to said body;

a member rotatably mounted on said bracket, said member having a cylindrical brake surface;

a flexible element windable on said member for connection to a support so as to transmit the inertia of the body to said support;

a capstan spring having a plurality of coils frictionally engaging said brake surface to prevent rotation of said member relative to the brake surface, means for restraining rotation of said spring and thereby prevent rotation of said member and unwinding of said element and movement of said body relative to said support, said element being mounted in a manner such that increasing the acceleration forces on said body increases the engaging force of said spring against said member;

an acceleration sensor moveably mounted on said support in a manner such that the inertia of the sensor causes the sensor to move relative to said support; and means responsive to the movement of said sensor for applying a force on said capstan spring to limit the braking force of said spring against said brake surface so as to permit movement between said spring and said member at a predetermined acceleration to limit the acceleration forces applied to said body.

14. Apparatus for limiting the acceleration applied to a body spaced from surrounding supports and being suspended or supported by said supports by means of flexible elements extending between the body and the supports, said apparatus comprising:

a housing;

a generally cylindrical drum rotatably mounted in said housing;

a cable wound around the periphery of the drum with the ends of the cable extending outwardly in opposite directions to form said flexible elements to be connected to said supports;

a capstan spring frictionally engaging a cylindrical surface on said drum to brake rotation of the drum;

stop means fixed with respect to said housing to cooperate with the ends of said capstan spring in a manner such that tension applied to either end of said cable to urge the drum to rotate in either of two opposite directions will tend to cause the braking action between the spring and the drum to increase and prevent rotation of the drum; and acceleration responsive means for applying a force to said capstan spring which limits the braking caused by said capstan spring whereby said drum can rotate relative to said capstan spring in either of two opposite directions at said predetermined acceleration;

15. The apparatus of claim 14 including a pair of end plates secured to said housing and extending into the ends of said drum to rotatably support the drum, and wherein the capstan spring is positioned within said drum and includes a plurality of coils tightly engaging the inner cylindrical braking surface on said drum with one end of the capstan spring being located adjacent one end plate and the other end of the capstan spring being located adjacent the other end plate; and said stop means includes a projection on each of said end plates extending axially inwardly to cooperate with said spring ends to prevent rotation of the capstan spring.

16. The apparatus of claim 15 wherein said acceleration responsive means includes an inertia mass positioned within said capstan spring and pivotally supported by pins extending inwardly from said end plate, with said inertia mass including means for cooperating with said spring to provide a winding force on said spring when said inertia mass senses a predetermined acceleration and pivots about its supporting pins to provide said winding force.

17. The apparatus of claim 16 including means for centering said body between said supports after the body has been moved out of its centered position.

18. The apparatus of claim 16 wherein said centering means includes a centering rod positioned in a groove between said housing and each of said end plates, said centering rod seach including a notch finger on one end which extends into a centering notch on the edge of said drum when the drum is centered with respect to said end plates; and pawl means cooperating with a pawl finger on the other end of each of said centering rods to cooperate with the ends of said capstan spring in a manner to produce a slight winding force on said capstan spring when said cables are subjected to jiggling motion.

19. The apparatus of claim 18 wherein said centering means further includes a groove formed in each of said end plates, said pawl means includes a pawl having a portion positioned in each of said grooves, and pivotally mounted on said pawl finger in said groove, said pawl finger including a pin portion which extends into the path of spring winding pins attached to each end of said capstan spring, said pawl pin portions being arranged to cooperate with said winding pins to restrain movement of said capstan spring in one direction in response to a jiggling force applied to said drum by way of said cable wherein said restraining by said pawl results in a winding force being applied to said spring which permits the drum to move a small amount in one direction with respect to said capstan spring.

20. The apparatus of claim 19 wherein said notch finger is moved 90° when said drum is moved away from its centered position, and said pawl permits said pawl end of said rod to move only 45° in the same direction as said notch finger, whereby a torque is applied to said centering rod causing it to be held in tension until said drum notch is once more moved into alignment with said notch finger, allowing the notch finger to snap into engagement with said drum notch.

21. The apparatus of claim 14 wherein said drum has a centered position with respect to said housing and with respect to the cable extending in two directions away from the drum, and said drum further having an uncentered position in either of two opposite directions; and said apparatus including means responsive to jiggling movement of said mass to permit the drum to return to its centered position.

22. The apparatus of claim 21 wherein said centering means includes means which cooperate with said capstan spring arranged so that the jiggling movement of said body will apply a slight winding force to said capstan spring to permit the drum to move towards its centered position.

23. A method of limiting the acceleration applied to a body comprising:

attaching brake means to said body;

connecting the brake means to a support in a manner to permit limited movement of the body relative to the support;

applying said brake means to prevent movement of the body relative to said support;

sensing the acceleration applied to said body; and limiting the operation of said brake means at a sensed predetermined acceleration to permit braked movement of the body relative to said support at said predetermined acceleration.

24. The method of claim 23 wherein said connecting step includes connecting an end of a windable element to said support, with said windable element being wound on a drum within said brake means, and said connecting step further includes connecting another end of said windable element to a second support spaced from said first mentioned support, and said sensing step includes sensing the acceleration applied to said body in either of two opposite directions to protect the body from forces that produce acceleration above said predetermined acceleration in either of two opposite directions.

25. The method of claim 24 including the step of centering said body and said brake means relative to said supports by utilizing jiggling forces applied to said brake means by way of said windable element.

* * * * *